UNITED STATES PATENT OFFICE 2,349,405

β-CYANOETHYLATED ARYL ω-METHYL SULPHONAMIDES

Herman A. Bruson and Thomas W. Riener, Philadelphia, Pa., assignors to The Resinous Products & Chemical Company, Philadelphia, Pa., a corporation of Delaware No Drawing. Application June 4, 1943, Serial No. 489,700

6 Claims. (Cl. 260—465)

This invention relates to β-cyanoethylated aromatic ω-methyl sulphonamides and to a method of their preparation. More particularly, this invention deals with compounds of the formula:

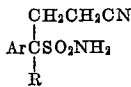

and

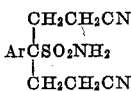

wherein Ar is an aryl nucleus and R is hydrogen, an alkyl group, or an aryl group. Since the dicyanoethylated products are conveniently regarded as γ-substituted pimelonitriles, this invention also deals with γ-aryl-γ-(sulphonamido)-pimelonitriles, these compounds being of particular importance.

The β-cyanoethylated ω-methyl aryl sulphonamides are prepared by reacting an aromatic ω-methyl sulphonamide and acrylonitrile in the presence of an alkaline condensing agent. One or two mols of acrylonitrile may be added to the carbon atom carrying the sulphonamido group with shift of the hydrogen thereon to the nitrile chain.

The resulting products are intended for use as therapeutic agents, primarily as intermediates. They also serve as intermediates for the preparation of carboxylic amides, esters, acids, and salts by known reactions involving hydrolysis. Many of these compounds are useful as plasticizers and softeners for resinous coatings and compositions.

The reaction between the ω-methyl aryl sulphonamides is applicable to such aryl compounds wherein the aryl group is a phenyl, naphthyl, diphenyl, anthryl, phenanthryl, or other aromatic group, as well as to their chloro, bromo, nitro, acetylamino, alkyl, alkoxy, aryl, acyl, etc., substituted derivatives.

As an alkaline condensing agent for effecting the reaction, there may be used any of the oxides, hydroxides, amides, hydrides, or alcoholates of the alkali metals, the alkali metals themselves, or strongly basic quaternary ammonium hydroxides. Typical of these agents are sodium or potassium hydroxide, sodium oxide, sodium amide, sodium methylate, potassium ethylate, benzyl trimethyl ammonium hydroxide, dibenzyl dimethyl ammonium hydroxide, benzyl butyl dimethyl ammonium hydroxide, etc. The alkaline condensing agent may be employed in an inert suspending medium or in a solvent for the reactants such as benzene, dioxane, or tertiary butyl alcohol.

In effecting the reaction, the quantity of alkaline condensing agent required is small, amounts from 0.5% to 10% of the weight of the reactants usually being sufficient. The reaction begins at 0° to 30° C., but can be accelerated by warming at 50° to 90° C. In cases where considerable heat is given out at the start of the reaction, it is generally advisable to control the reaction by cooling as well as by gradual combination of the reactants. The reaction mixture may be purified in any of the usual ways, such as extraction or crystallization. The products are generally crystalline compounds and are formed in good yields.

For example, 10.6 grams of acrylonitrile is added to a solution of 17.1 grams of benzyl or ω-toluene sulphonamide, 50 grams of dioxane, and 3 grams of aqueous 40% trimethyl benzyl ammonium hydroxide. The mixture is stirred for twenty-four hours at the ordinary room temperature and is then mixed with an equal volume of ethylene dichloride, neutralized with dilute hydrochloric acid, washed with water, and dried in vacuo at 90° C. The residue (27 grams), upon recrystallization from ethanol, forms colorless crystals which melt at 103°–104° C. and contain 15.15% of nitrogen and 11.93% of sulphur by analysis, corresponding to the formula:

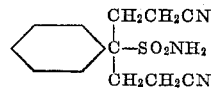

In the same manner, p-nitrobenzyl sulphonamide is condensed with two molecular equivalents of acrylonitrile in the presence of 1% by weight of methanolic 30% potassium hydroxide solution at 45°–50° C. in tertiary butyl alcohol as a solvent to yield the compound having the formula:

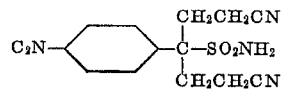

in the form of needle-like crystals. Upon reduction, it yields the corresponding p-amino compound.

Thus, by reacting acrylonitrile, CH₂=CHCN, with a compound of the formula:

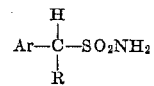

in the presence of an alkaline condensing agent, there are obtained mono- and/or di-β-cyanotheylated derivatives.

We claim:

1. A method for β-cyanoethylating aryl ω-methyl sulphonamides which comprises reacting acrylonitrile with an aryl ω-methyl sulphonamide in the presence of an alkaline condensing agent.

2. A method for preparing γ-aryl-γ-(sulphonamido)-pimelonitrile which comprises reacting an aromatic ω-methyl sulphonamide with acrylonitrile in the presence of an alkaline condensing agent.

3. A method for preparing γ-phenyl-γ-(sulphonamido)-pimelonitrile which comprises reacting ω-toluene sulphonamide with acrylonitrile in the presence of an alkaline condensing agent.

4. The method of claim 3 wherein the alkaline condensing agent is a strongly basic quaternary ammonium hydroxide.

5. As a new compound, a γ-aryl-γ-(sulphonamido)-pimelonitrile.

6. As a new compound, γ-phenyl-γ-(sulphonamido)-pimelonitrile.

HERMAN A. BRUSON.
THOMAS W. RIENER.